United States Patent
Jeong

(10) Patent No.: US 6,415,512 B1
(45) Date of Patent: Jul. 9, 2002

(54) METHOD AND APPARATUS FOR SURFACE PROCESSING OF SINTERED OILLESS BEARING

(75) Inventor: Dae Hyun Jeong, Kyungki-Do (KR)

(73) Assignee: Samsung Electro-Mechanics Co., Ltd., Kyunkgi-Do (KR)

(*) Notice: Subject to any disclaimer, the term of this patent is extended or adjusted under 35 U.S.C. 154(b) by 0 days.

(21) Appl. No.: 09/594,360

(22) Filed: Jun. 15, 2000

(30) Foreign Application Priority Data

Dec. 23, 1999 (KR) .............................. 99-60735
Dec. 23, 1999 (KR) .............................. 99-60736

(51) Int. Cl.[7] .......................... B21D 53/10; F16C 33/02
(52) U.S. Cl. .................... 29/898.13; 148/906; 384/279; 384/902; 72/355.6
(58) Field of Search .............................. 29/898, 898.12, 29/898.13, 898.057, 898.1, 465, 421.1, 421.2, 425, 446, 530, 527.1; 148/906; 384/279, 902, 114, 397, 408; 72/353.2, 354.6, 355.6, 356

(56) References Cited

U.S. PATENT DOCUMENTS

| 5,043,123 | A | * | 8/1991 | Gormanns et al. ........... 264/113 |
| 5,129,738 | A | * | 7/1992 | Nakagawa ................... 384/279 |
| 5,167,885 | A | * | 12/1992 | Rice et al. ..................... 264/56 |
| 5,372,433 | A | * | 12/1994 | Nakanishi et al. ........... 384/192 |
| 5,785,429 | A |  | 7/1998 | Jeong .......................... 384/397 |
| 5,810,481 | A | * | 9/1998 | Nii et al. ..................... 384/279 |
| 5,941,646 | A | * | 8/1999 | Mori et al. .................. 384/279 |
| 5,945,050 | A |  | 8/1999 | Jeong .......................... 264/119 |
| 6,049,983 | A | * | 4/2000 | Miyasaka et al. ....... 29/898.057 |
| 6,105,250 | A | * | 8/2000 | Tanaka et al. ............ 29/898.02 |
| 6,244,749 | B1 | * | 6/2001 | Nakagawa et al. ......... 384/114 |
| 6,250,807 | B1 | * | 6/2001 | Mori et al. .................. 384/100 |

FOREIGN PATENT DOCUMENTS

JP           5-180229           7/1993

* cited by examiner

Primary Examiner—David P. Bryant
(74) Attorney, Agent, or Firm—Darby & Darby

(57) ABSTRACT

A method for surface processing of sintered oilless bearing and an apparatus thereof are disclosed by which method the efficiency of covering the pores and the surface roughness of protuberance that is nonporous surface may be improved by means of surface processing of inner diameter surface at time of sizing process using a correcting rod where many correction grooves have been formed on its top part. The invention has features that it may improve the efficiency of covering the pores formed on surface and the surface roughness of sintered oilless bearing's inner diameter surface contacting the shaft, by way of passing the bearing through many correction grooves formed in longitudinal direction on outer circumferential surface of protuberance correction part which is upper part of said correcting rod while at the same time the bearing sintered after compression molding is sized using a sizing device composed of correcting rod and upper and lower punches and that the invention precludes abrasion by reducing the force of friction with shaft in motor applying such sintered oilless bearing so that motor performance reliability may be substantially enhanced.

6 Claims, 11 Drawing Sheets

METHOD AND APPARATUS FOR SURFACE PROCESSING OF SINTERED OILLESS BEARING

BACKGROUND OF THE INVENTION

1. Field of the Invention

Present invention relates to a method and apparatus for surface processing of a sintered bearing that retains oil and particularly relates to said method and apparatus which enable improvements of the efficiency of covering the blow holes and the surface roughness of protuberances that are poreless surfaces by way of making the inner diameter surface to be surface processed by a correction rod, where many correction grooves have been formulated at the top part, at least in the sizing process.

2. Description of the Prior Art

Generally, a sintered oilless bearing is of the type introduced in Japan Patent Publication Hei No. 5-180229, in which a bearing has a shape as in FIG. 1, where many protuberances 1a and grooves 1b have been formed on the inner circumferential surface.

Such a sintered oilless bearing 1 is made to have porosity, as a whole, by way of a sintering process, after compression molding in a definite frame, in which state the bearing is manufactured by permeating oil.

Sintered oilless bearing 1 manufactured by the above method constitutes a bearing unit retained by forced fit insertion in a bearing housing. If a shaft is inserted in the inner diameter part of a sintered oilless bearing 1 retained in the bearing housing, oil is emitted from each groove 1b of the sintered oilless bearing 1 at the time of shaft rotation. If this oil is coated on the inner surface of protuberance 1a, the shaft makes sliding contact with the oil film formed thereby, so that the shaft is smoothly driven.

Meanwhile, oil permeation in the sintered oilless bearing 1 is under the sintered condition of the sintered oilless bearing 1, before which oil permeation, a sizing pricess is performed that processes the inner surface of the bearing.

This sizing process is performed by a separate sizing tool that reciprocates on the inner surface of protuberance 1 a so that the surface is smoothed and the process carries out the function so that pores formed on the surface are blocked at the same time.

If the sintered oilless bearing is processed on its surface by such sizing process, the oil emitted out of the groove when the shaft revolves in the motor is coated on the inner diameter surface with protuberance 1a so that an oil film of definite thickness is formed so as to substantially reduce the frictional force with the shaft and to allow smooth driving.

The present applicant has already proposed a correction device and method that allow processing of the inner surface with protuberances 1a that are formed at sintered oilless bearing 1, in Japan Patent Registration No. 2912599.

Namely, as in FIG. 2, a correcting rod 2 is furnished that is integrally formed by an upper part of the protuberance correction part 2a, a groove formation part 2b having a larger outer diameter than this protuberance correction part 2a, and a protuberance formation part 2c having a smaller outer diameter than the protuberance correction part 2a, by inserting the outer circumferential surface of the connection part radially between the protuberance correction part 2a and groove formation part 2b so that the inner diameter surface of protuberance 1a may be surface processed using the above furnished correcting rod 2.

When it made in bearing 1, just after sintering, the outer diameter of protuberance correction part 2a is equal to the inner diameter of protuberance 1a, and the outer diameter of groove formation part 2b is equal to the outer diameter of groove 1b, while the outer diameter of protuberance formation part 2c is less than the inner diameter of protuberance 1a.

In the prior invention, there were furnished, together with the above correcting rod 2, upper and lower punches and a guide frame that guides so that the upper and lower punches may slide up and down for inner diameter surface processing of the sintered oilless bearing 1.

If bearing 1 is pushed from above by upper punch 3 using such correction device as in FIG. 3, bearing 1 is compressed, from above and below, between upper punch 3 and lower punch 4, because the bottom surface of bearing 1 is supported by lower punch 4, so that the thickness of bearing 1 is decreased, in fine degree, at this time, and the inner diameter of protuberance 1a is decreased and eventually, it contacts closely with outer the diameter surface of protuberance formation part 2c so as to be equal in diameter with protuberance formation part 2c.

If upper punch 3 is moved upward in this compressed state so as to be out of guide frame 5 and also lower punch 4 is moved upward, bearing 1, seated on lower punch 4, is moved upward at same time.

If bearing 1 is thus moved upward, it passes protuberance correction part 2a, because correcting rod 2 remains fixed, so surface processing takes place, as inner the diameter surface of protuberance 1a, with reduced inner diameter of bearing 1, passes protuberance correction part 2a, having larger outside diameter than the inner diameter surface.

Namely, because the inner diameter surface of protuberance 1a closely contacts the outer diameter surface of protuberance formation part 2c owing to compression by upper punch 4, it has a diameter equal to the outer diameter of protuberance formation part 2c. While protuberance correction part 2a is made to have a larger outer diameter than protuberance formation part 2c, the inner diameter surface of protuberance 1a is expanded to have an inner diameter equal to the diameter of protuberance correction part 2a, as protuberance 1a passes protuberance correction part 2a.

Such inner diameter expansion takes place by forcibly pushing the inner diameter surface of protuberance 1a, whereby the inner diameter surface of protuberance 1a, having a rough surface by sintering, becomes smoother as numerous blowholes formed on the surface are closed.

Thus, if lower punch 4 is moved upward to pass through protuberance correction part 2a of correcting rod 2 so as to completely clear correcting rod 2, we are furnished with a sintered oilless bearing 1 that is surface processed, to be used by assembling at bearing holder after permeating the oil.

If sintered oilless bearing 1 is surface processed by the above correction device, concentricity between protuberance 1a and groove 1b is accurately restored, which was lost during sintering process of sintered oilless bearing 1, and the surface friction with the shaft contacting the inner diameter surface of protuberance 1a may be reduced.

However, protuberance correction part 2a in correcting rod 2 makes the outer circumferential surface to be simply planar in previous invention. Although there is merit in that inner diameter surface roughness is somewhat improved by inner diameter surface processing using such correcting rod 2, there is a disadvantage in that blowhole covering of the porous surface, which is the most important, is not accomplished properly.

If porous surface blowholes are not properly covered, there arises a problem that the oil film is not properly formed when the shaft revolves, because a part of the oil ejected from groove 1b is again absorbed in inner diameter surface of protuberance 1a while sintered oilless bearing 1 is being used, having been assembled as a bearing unit after permeating the oil as described above.

Because oil film formed on this inner diameter surface is a factor having the greatest influence on friction force with the shaft, friction surface wear is eventually accelerated by an intensified friction force between the shaft and the inner diameter surface of protuberance 1a, so that the useful life of the bearing is cut short, and the friction force acts as a load to the shaft drive force, at the same time, so that there is also another serious problem that the required drive force is not exerted.

SUMMARY OF THE INVENTION

Present invention is devised to correct the above problems and its main purpose is to improve oil film formation efficiency on the inner diameter surface by forming one or more correction grooves on the outer circumferential surface of the protuberance correction part in the correcting rod, so that blowholes formed at the inner diameter surface of protuberance would effectively be closed at the time of the sizing process by the correcting rod.

Another purpose of the present invention is to further improve the covering efficiency of blowholes by also performing surface processing at the time of assembling bearing unit by making one or more correction grooves to be formed on the outer circumferential surface of a mandrel during the process of assembling with the bearing holder, not only with the above surface processing during the sizing process.

The present invention, to achieve the above purposes, features a fabrication method comprising a step of compression molding a metal powder having been put in a definite frame, a step of sintering the molded bearing, a step of inserting the sintered bearing in the correcting rod so that the bearing is seated on the lower punch top in the guide frame, a step of compressing the bearing seated on the lower punch by an upper punch, a step of separating the upper punch from the guide frame by lifting the upper punch, a step of covering numerous blowholes formed at inner diameter surface as the inner diameter surface of the protuberance is expanded according to a plurality of correction grooves formed on the outer circumferential surface of the protuberance correction part, by lifting the lower punch so that the compressed bearing passes through the protuberance correction part of the correcting rod, a step of separating the surface processed bearing from the correcting rod by completely lifting up the lower punch, a step of permeating oil in the sintered oilless bearing that has been surface processed, and a step of assembling the sintered oilless bearing by forced fitting, having spacers laid on top and bottom of a bearing holder, using the upper and lower punches and mandrel.

DETAILED DESCRIPTION OF THE PREFERRED EMBODIMENT

Usually, largely the bearing unit is composed of a bearing holder, sintered oilless bearings fitted by forced fit over and under respectively in the inner diameter part of this bearing holder, and a spacer keeping these sintered oilless bearings separated from each other with a definite gap.

Grooves where oil is omitted and protuberances by which the shaft is supported are alternatively formed in a sintered oilless bearing furnished in the bearing unit, which grooves and protuberances are formed simultaneously with molding of the sintered oilless bearing.

Meanwhile the process to make a sintered oilless bearing is as follows.

Generally sintered oilless bearing is compression molded as metal powder has been put in a definite frame.

The molded bearing goes through the sintering process while numerous pores are formed interstitially whence yet many grooves and protuberances are alternatively formed in the inner diameter part of the molded and sintered being.

Numerous pores, including blowholes are formed in grooves and protuberances in the bearing manufactured as above, which pores are permeated by and retain the oil which is ejected when the motor is driven.

Because the inner diameter surface of the protuberance is in surface contact with the shaft, and severe abrasion will be accelerated by excessive friction with the shaft, an oil film of a certain thickness should be formed.

Therefore, the inner diameter surface of the protuberances should be made free of surface roughness, to minimize friction with the shaft, while numerous pores formed on the surface should be filled up, for which action sizing of sintered oilless bearing should be carried out.

Figure 1:
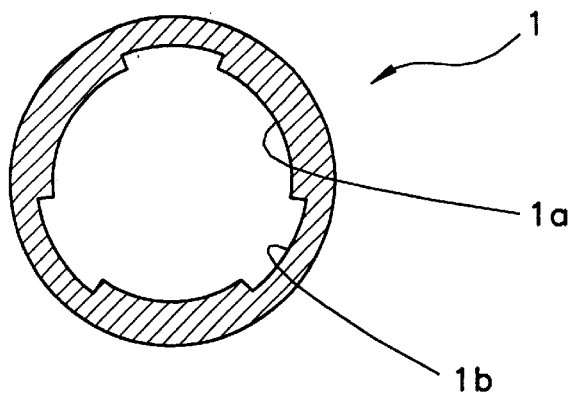
FIG. 1 is a plane cross sectional view showing an ordinary sintered oilless bearing.
Figure 2:
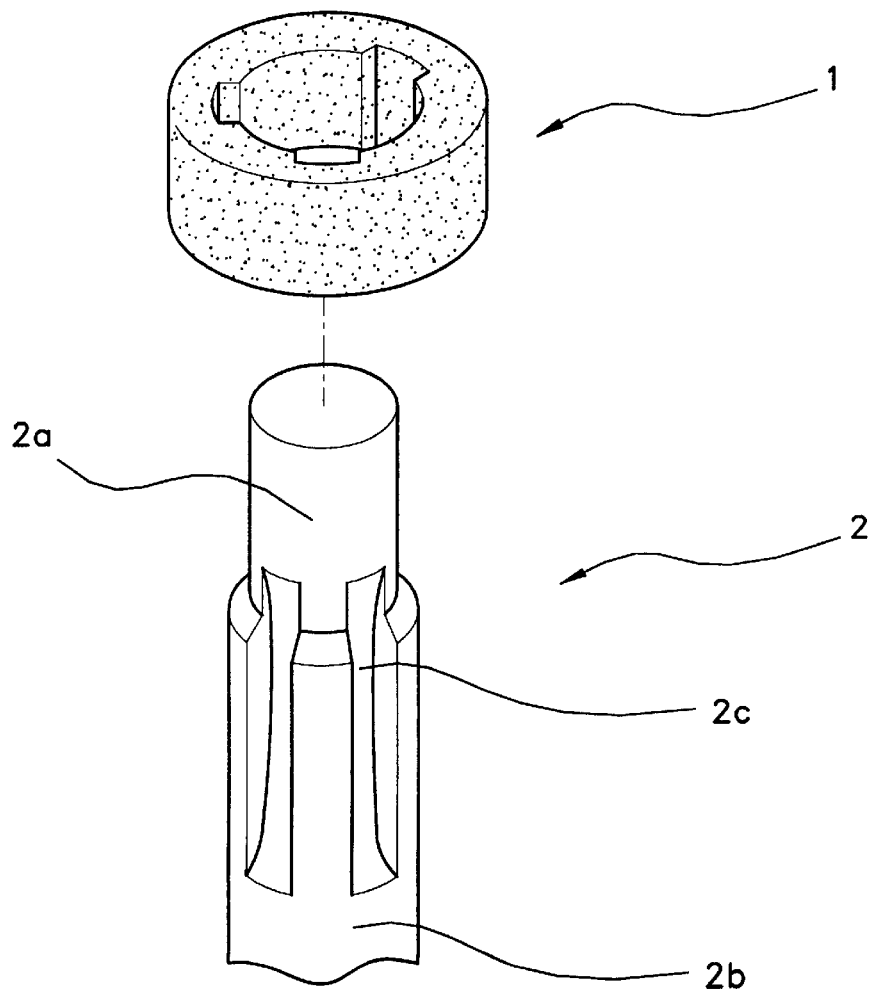
FIG. 2 is a partial perspective view showing a correcting rod used in traditional sizing of a sintered oilless bearing.
Figure 3:
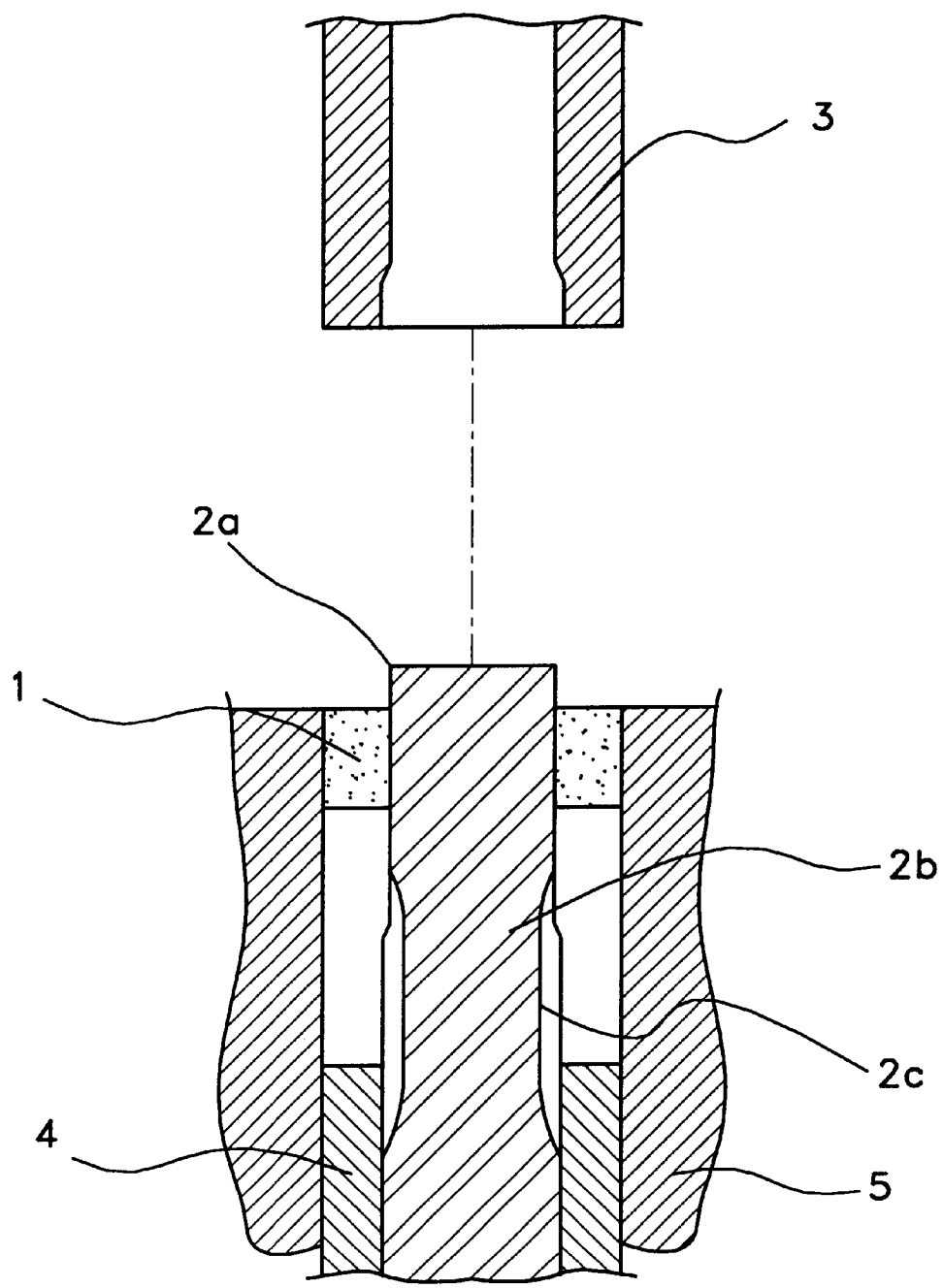
FIG. 3 is a cross-sectional view showing the traditional surface treatment action of a sintered oilless bearing.
Figure 4:
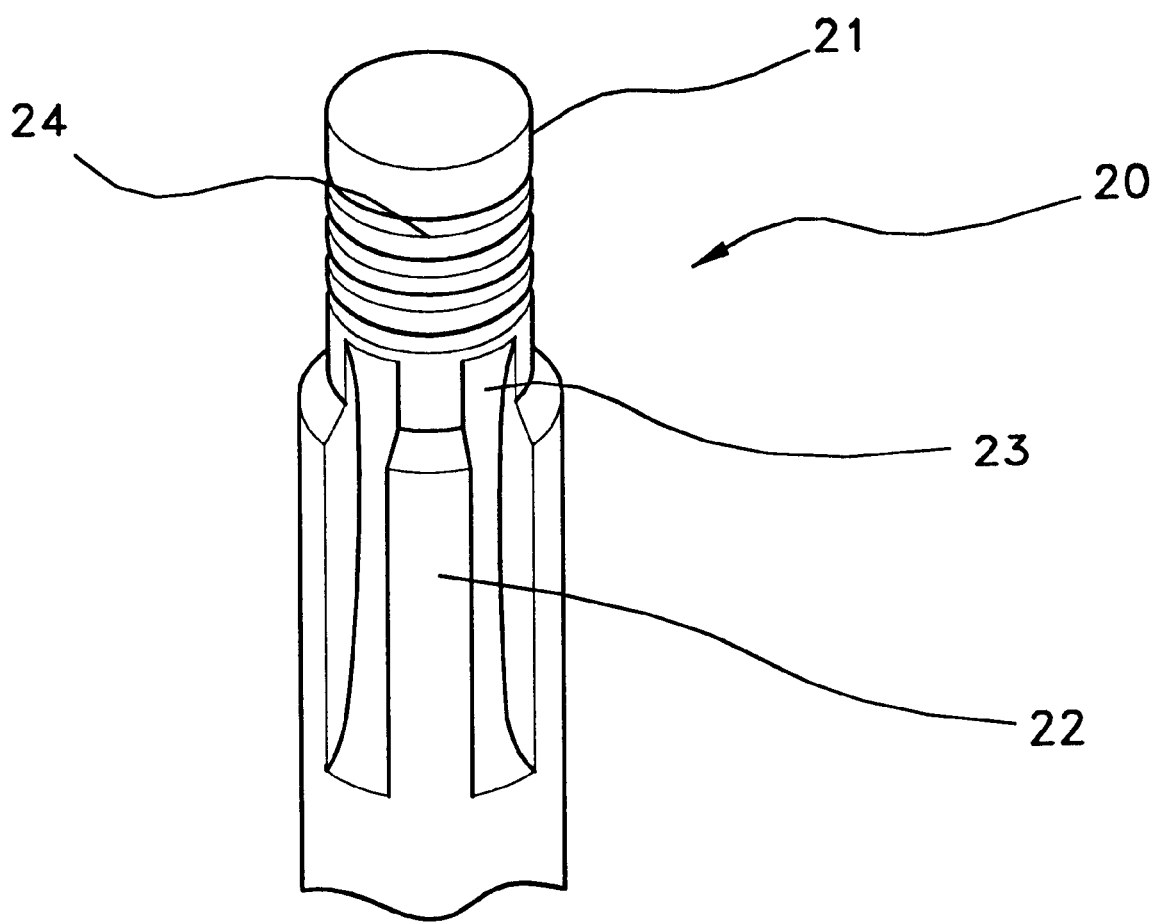
FIG. 4 is a partial perspective view showing a correcting rod formation according to present invention.
Figure 5:
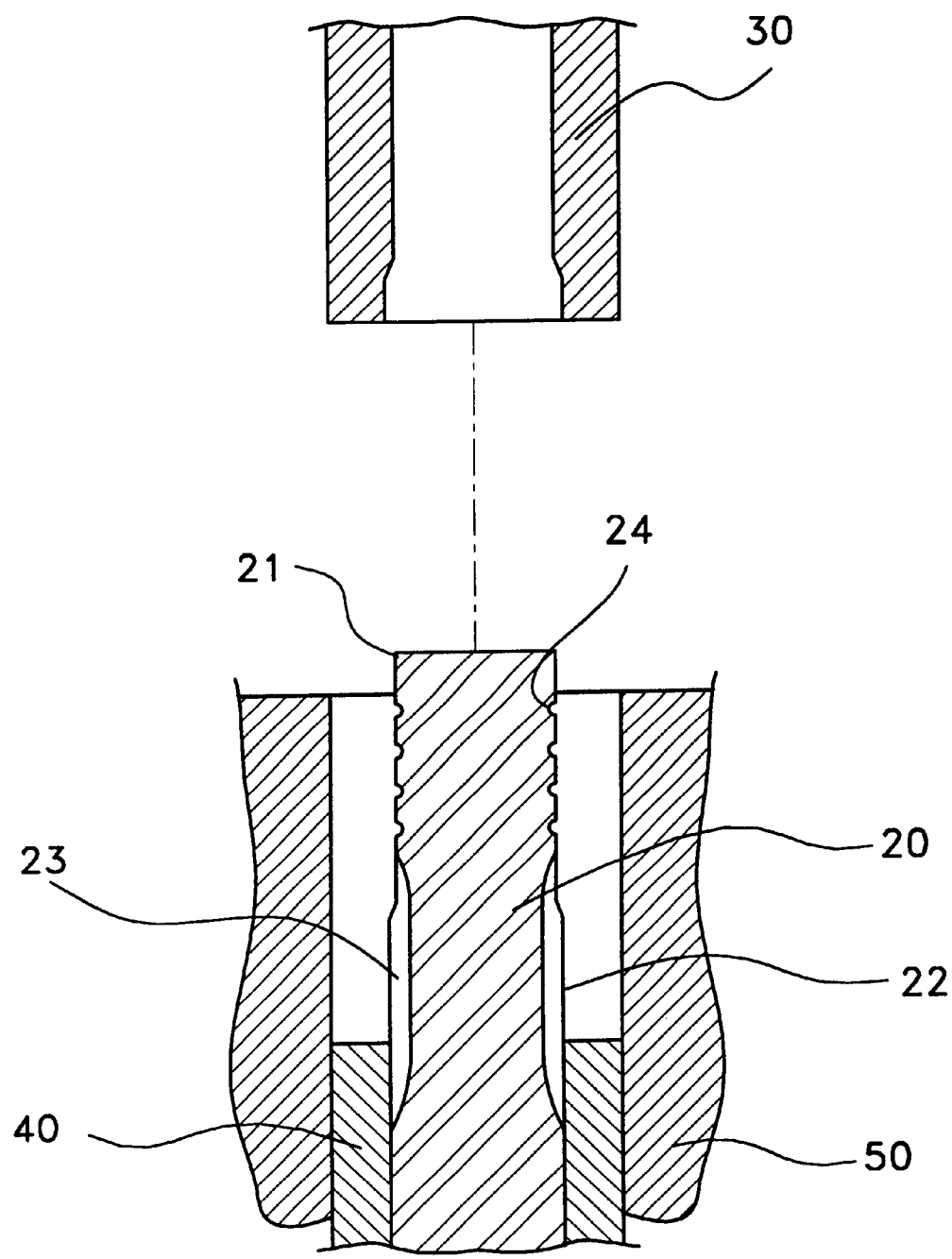
FIG. 5 is a cross-sectional view showing an outline of the sizing device of a sintered oilless bearing according to the present invention.

The formation furnished as means for performing the sizing is almost the same as a conventional one, as shown in FIG. 5.

Broadly, the sizing device is composed of a correcting rod 20, upper punch 30, lower punch 40 and guide frame 50.

Correcting rod 20 is a vertical rod member with an upper part formed of the protuberance correction part 21, having an outer diameter equal to the inner diameter of the protuberances formed in the inner diameter part of the molded and sintered bearing 10. A lower part has a groove formation part 22 of outer diameter equal to the inner diameter of the grooves. A connection part between protuberance correction part 21 and groove formation part 22 is tapered while, in an outer circumferential surface including this tapered part, protuberance formation part 23 having smaller outer diameter than protuberance correction part 21 is made with the same intervals and number of protuberances formed at bearing 10.

Such correcting rod 20 was already suggested in present the applicant's previous registered invention while the greatest structural feature in present invention is to form correction grooves 24 at outer circumferential surface in such protuberance correction part 21 of correcting rod 20.

Namely, the present invention enhances surface processing efficiency by forming annular correction grooves 24 along the length of the outer circumferential surface of protuberance correction part 21, which is the top part of correcting rod 20.

Upper punch 30 is formed to be insertable in protuberance formation part 23 and groove formation part 22 of correcting rod 20, and it acts to compress bearing 10 from above.

Lower punch 40 is inserted in the lower part of correcting rod 20, to support the correcting rod 20. Meanwhile the punch acts as a seat for bearing 10, which inserted on the top part.

Namely, this punch firmly supports bearing 10 when bearing 10 is compressed by upper punch 30, by seating the bearing 10 on top of it and it lifts bearing 10 at the same time this punch itself moves upward, so that correction grooves 24 of correcting rod 20 pass up being enlarged of inner diameter.

On the other hand, guide frame 50 supports the outer circumferential surface so that upper punch 30 and lower punch 40 are able to move up and down vertically.

In such sizing device, the cylindrical lower punch 40 is inserted in guide frame 50 as in FIG. 5 while correcting rod 20 is inserted in the center of this lower punch 40, so that the top part of lower punch 40 is on the same level as protuberance formation part 23 of correcting rod 20.

Thus, it is the most preferable that lower punch 40 top part be positioned at a lower part side of protuberance formation part 23, because protuberance formation part 23 is vertically formed to definite length at the connection between protuberance correction part 21 and groove formation part 22 in the correcting part 20.

Figure 6:
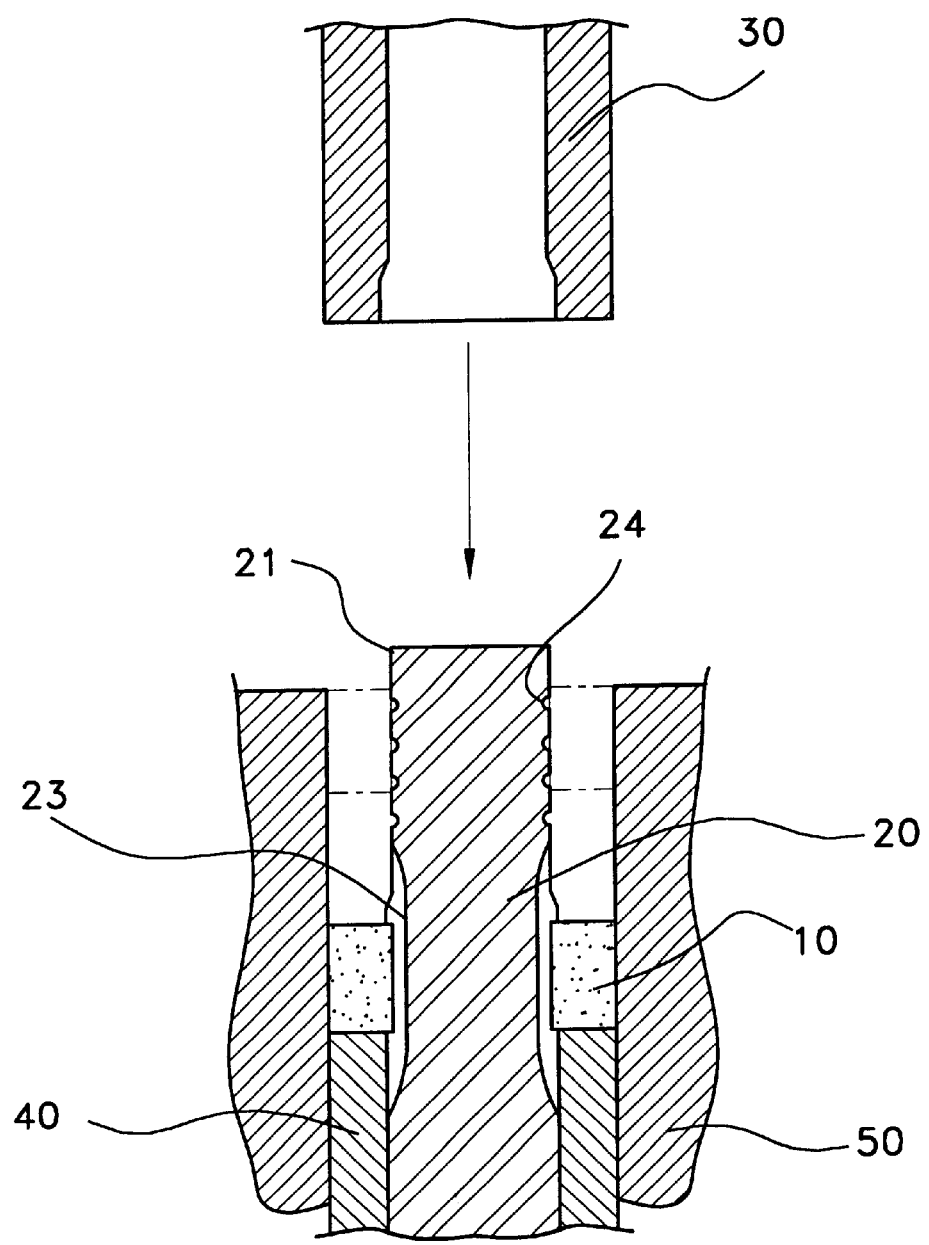
FIG. 6 is a cross-sectional view showing the sintered bearing being inserted in the sizing device so as to be sized according to the present invention.

If bearing 10 is inserted in its sintered state into correcting rod 20 under the above condition, as in FIG. 6, protuberance correction part 21 can easily be passed through, because the inner diameter of bearing 10 equals the outer diameter of protuberance correction part 21 that is furnished at the upper part of correcting rod 20, and bearing 10 can be easily inserted also in groove formation part 22 and be easily seated on lower punch 30, as protuberance formation part 23 has a smaller outer diameter than inner diameter of bearing 10 and, as groove formation part 22 has been formed with a diameter equal to the inner diameter of the groove between protuberances of bearing 10.

Meanwhile there will not be a large friction force because the diameters of the inner diameter surface and the outer diameter surface, that are in contact with each other during insertion of bearing 10 into correcting rod 20, are the same, so that the insertion may be easy.

Figure 7:
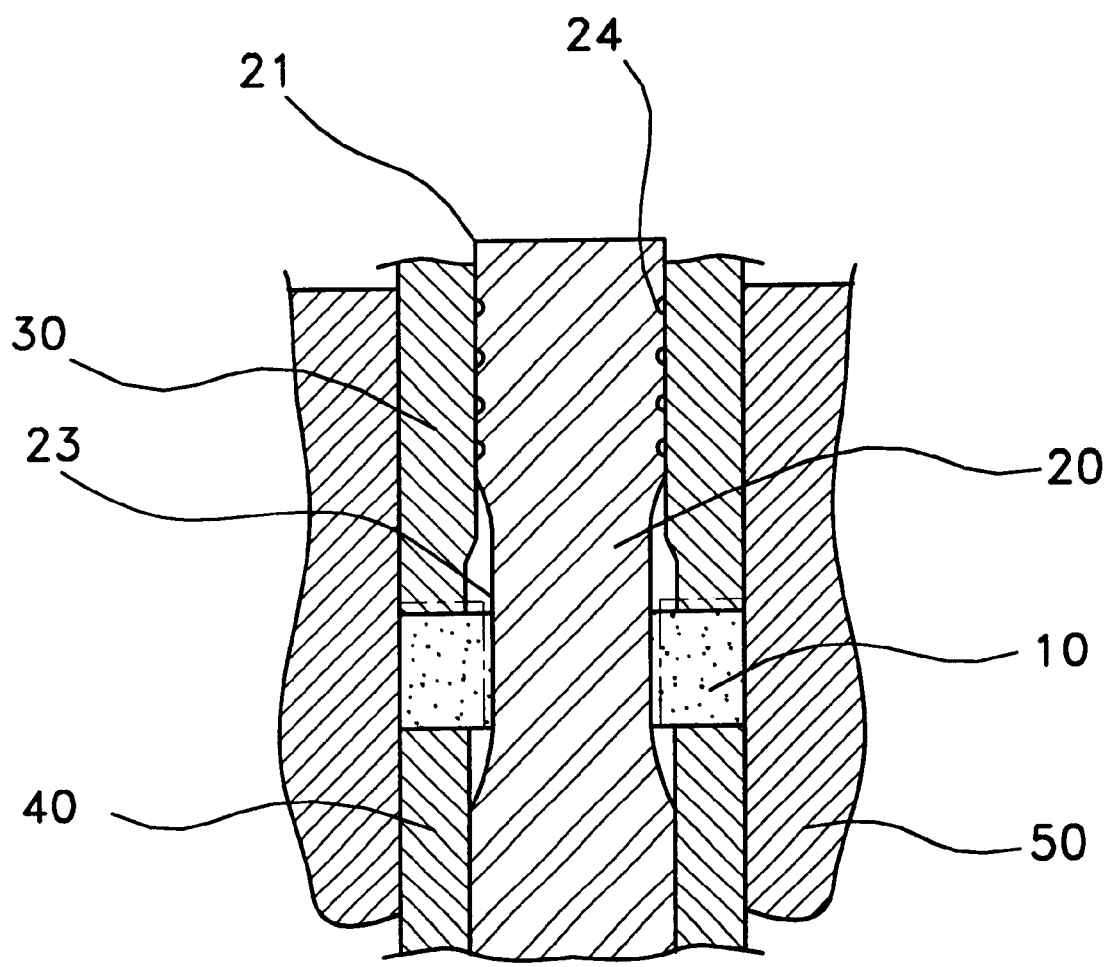
FIG. 7 is a cross-sectional view showing where the bearing being inserted in the sizing device in FIG. 6 is pressed by an upper punch.

Bearing 10, inserted thus, is compressed and seated upon lower punch 40 by pressurizing with upper punch 30 inserted as in FIG. 7. Hence, bearing 10 exhibits the phenomenon that it is compressed in the vertical direction, while the outer diameter and inner diameter are rather enlarged in the side direction.

Namely, bearing 10 is expanded sideways as its length in the vertical direction is reduced, but particularly the outer diameter surface comes into close contact with guide frame 50, so that it is impossible to expand more. However, the inner diameter surface of bearing 10 which surface is at protuberance formation part 23 is expanded more into inner side and comes to close contact with outer diameter surface of protuberance formation part 13.

Figure 8:
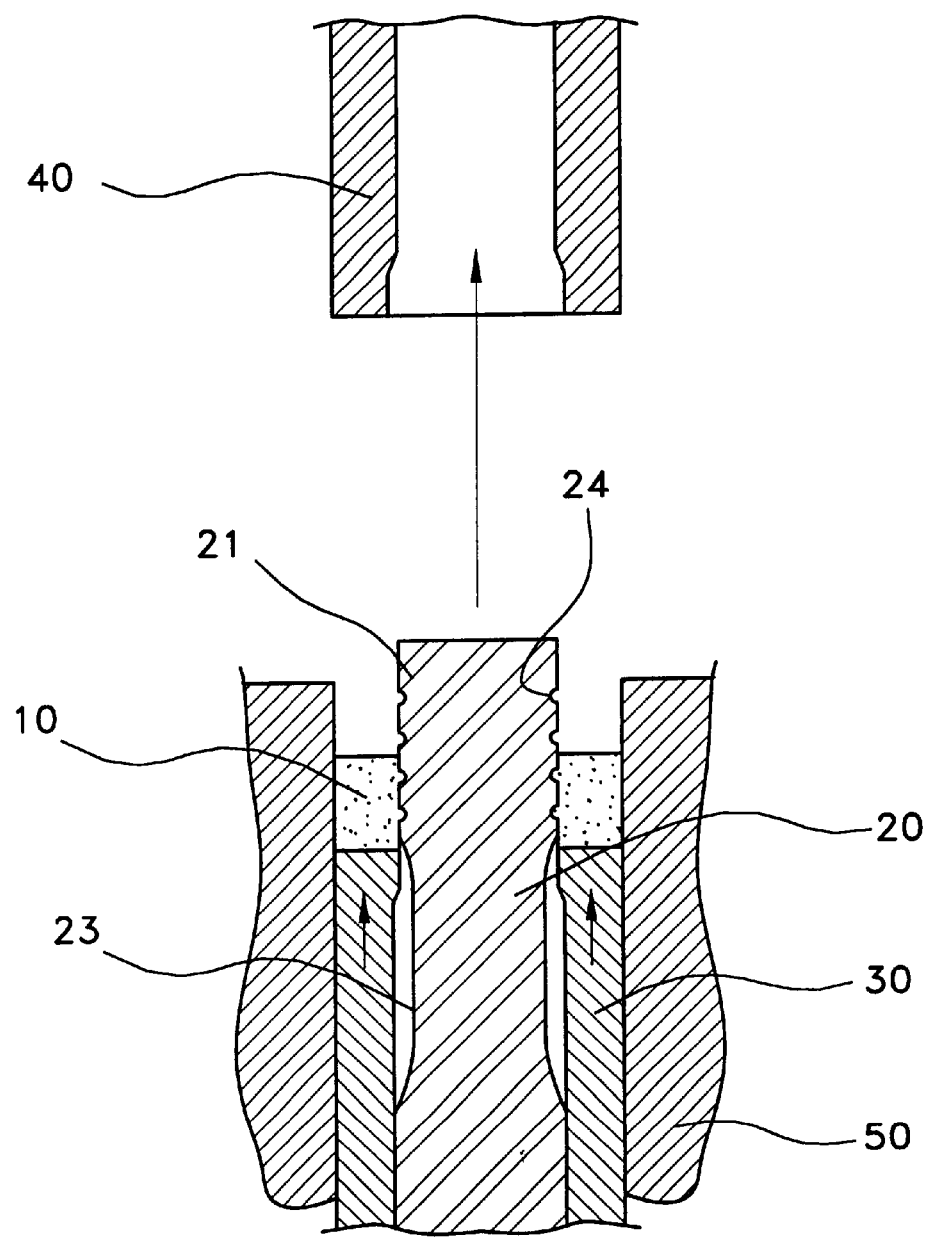
FIG. 8 is a cross-sectional view showing the inner diameter surface is processed by lifting the lower punch in the sizing device of the present invention.

Upper punch 30 moves upward again, as in FIG. 8, after compressing the bearing 10 and lower punch 40 starts to move upward when bearing 10 is completely separated from correcting rod 20 and guide frame 50, whereby bearing 10 under compressed condition seated upon lower punch 40 also goes upwards at same time.

Figure 9:
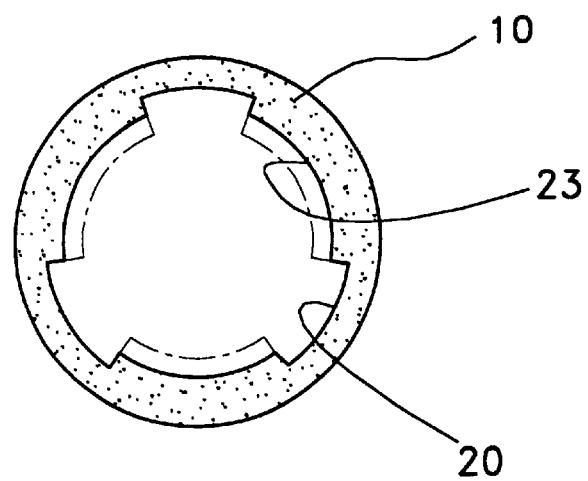
FIG. 9 is a plan view of a bearing showing the inner diameter of the bearing processed according to FIG. 8 is magnified.

When bearing 10 goes up, the inner diameter surface of protuberance projected inward is in close contact with outer diameter surface of protuberance formation part 23, so that inner diameter is under shrunk condition, but, as outer diameter of protuberance correction part 21 has been formed larger than outer diameter of protuberance formation part 23, inner diameter is enlarged as in FIG. 9 while inner diameter surface is coercively trusted outward when bearing 10 passes protuberance correction part 21 of correcting rod 20.

Whereby, the inner diameter surface of bearing 10 is not simply enlarged but also finished to become smooth, and particularly numerous pores formed in inner diameter surface are filled up by correction grooves 24 formed in outer circumferential surface of protuberance correction part 21.

Figure 10:
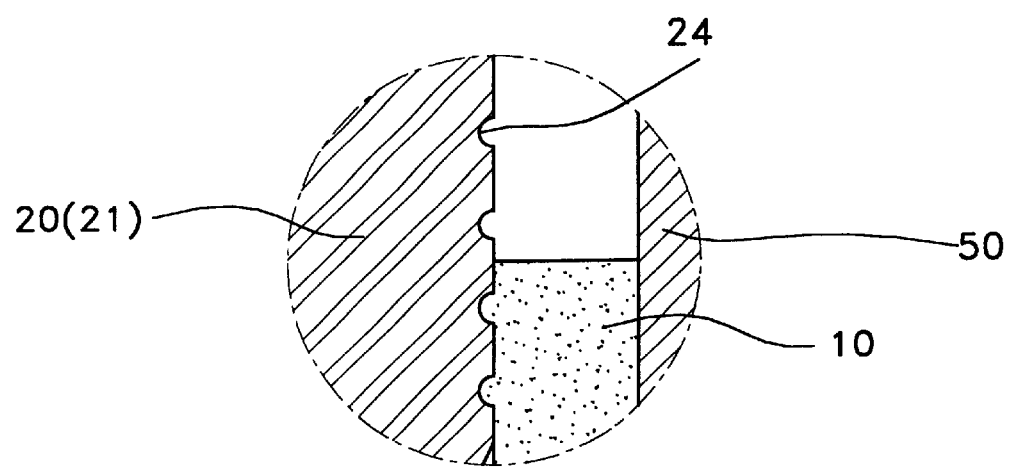
FIG. 10 is cross section view of a loin part showing the formation where a part of inner diameter surface is inserted in correction grooves while the bearing is pressed by an upper punch in the sizing device according to present invention.

Namely, the inner diameter surface of bearing 10 is coercively expanded to have same inner diameter as outer diameter of protuberance correction part 21 while bearing 10 passes protuberance correction part 21 whence inner diameter surface of bearing 10 passing the correction grooves 24 is momentarily expanded to inside of correction grooves 24 as in FIG. 10 which expanded part is overlapped to the next coming inner diameter surface, so that most pores formed the in inner diameter surface at the time of sintering of bearing 10 are filled up to make a smooth surface.

Sintered oilless bearing of wanted shaped and size is completed by getting bearing 10 completely out of protuberance correction part 21 of correcting rod 20 by rise of lower punch 40 as described above.

Particularly, pore filling in the inner diameter surface of protuberance having surface friction with shaft in sintered oilless bearing 10 can be substantially improved if sintered oilless bearing 10 is surface processed through the above described process.

By the way, sintered oilless bearing 10, made through the sizing process is fitted by force to the bearing holder by means of assembling device, after permeating the oil through pores.

Figure 11:
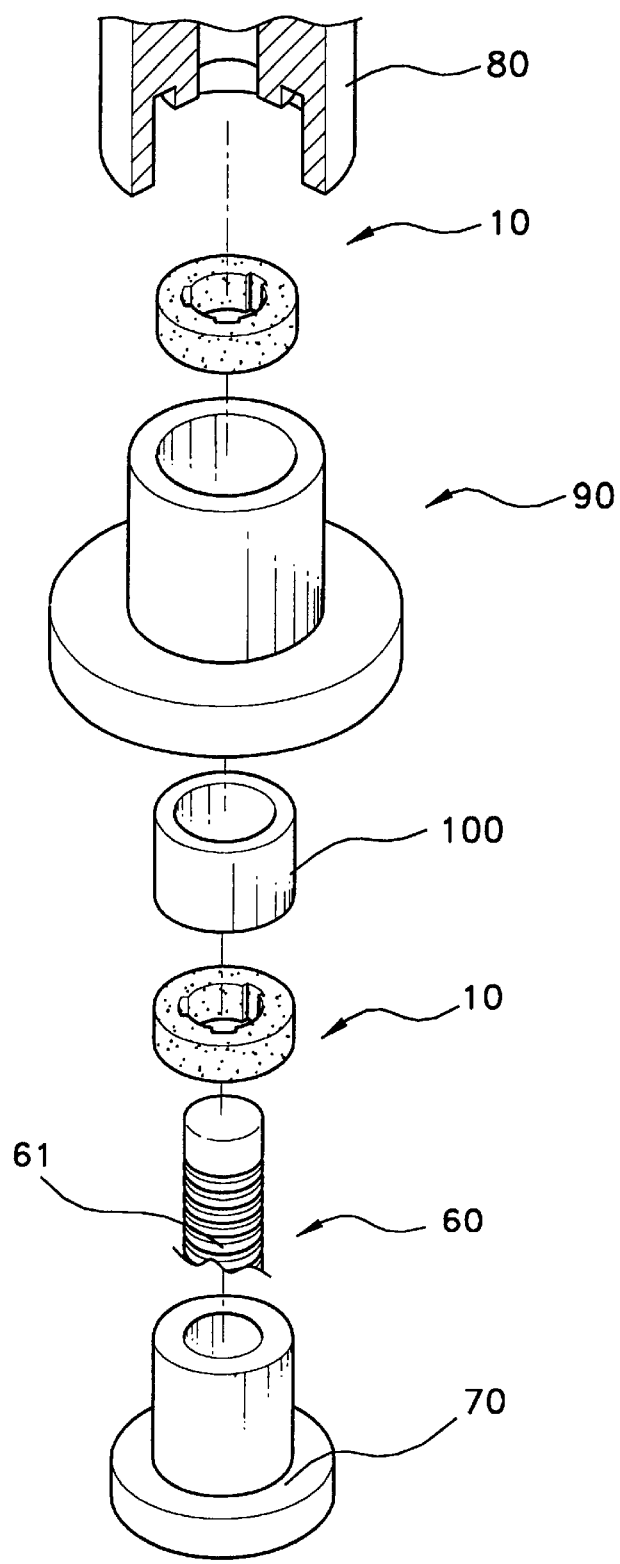
FIG. 11 is an exploded perspective view showing an assembling device of a bearing unit according to the present invention.

There are fixed metal mold 70 furnished at bottom, mandrel 60 inserted penetrating through this fixed metal mold 70 so that upper part of mandrel 60 is projected upward, and press metal mold 80 to press downward from above as in FIG. 11 for components of apparatus assembling at the bearing holder.

Mandrel 60, inserted in fixed metal mold 70, is rod member whose plane cross section is simply circular; sintered oilless bearing 10 manufactured as described above, bearing holder 90, and spacer 100 are inserted in fixed metal mold 70, which inserted part materials are firmly bound with each other by press metal mold 80.

Namely, bearing 10 and spacer 100 are fixed by interference fit to be solidly settled by pressing by press metal mold 80 after bearing 10, bearing holder 90 and spacer 100 are inserted to mandrel 60 inserted in fixed metal mold 70.

Particularly, it is customary to assemble a pair of upper and lower sintered oilless bearings 10 ordinarily in upper and lower parts, respectively, of bearing holder 90 of the bearing unit furnished in a motor.

On other hand, sintered oilless bearing 10 that has been surface processed by correcting rod 20 in a sizing process may be again surface processed in an assembling process.

Namely, the inner diameter of sintered oilless bearing 10 may be again surface processed in the assembling process when mandrel 60 is moved downward from press metal mold 80, when the bearing unit is completely assembled after forming many correction grooves 61 in the outer circumferential surface of mandrel 60, that is a rod member, similar to correction grooves 24 formed in protuberance correction part 21 of correcting rod 20.

Figure 12:
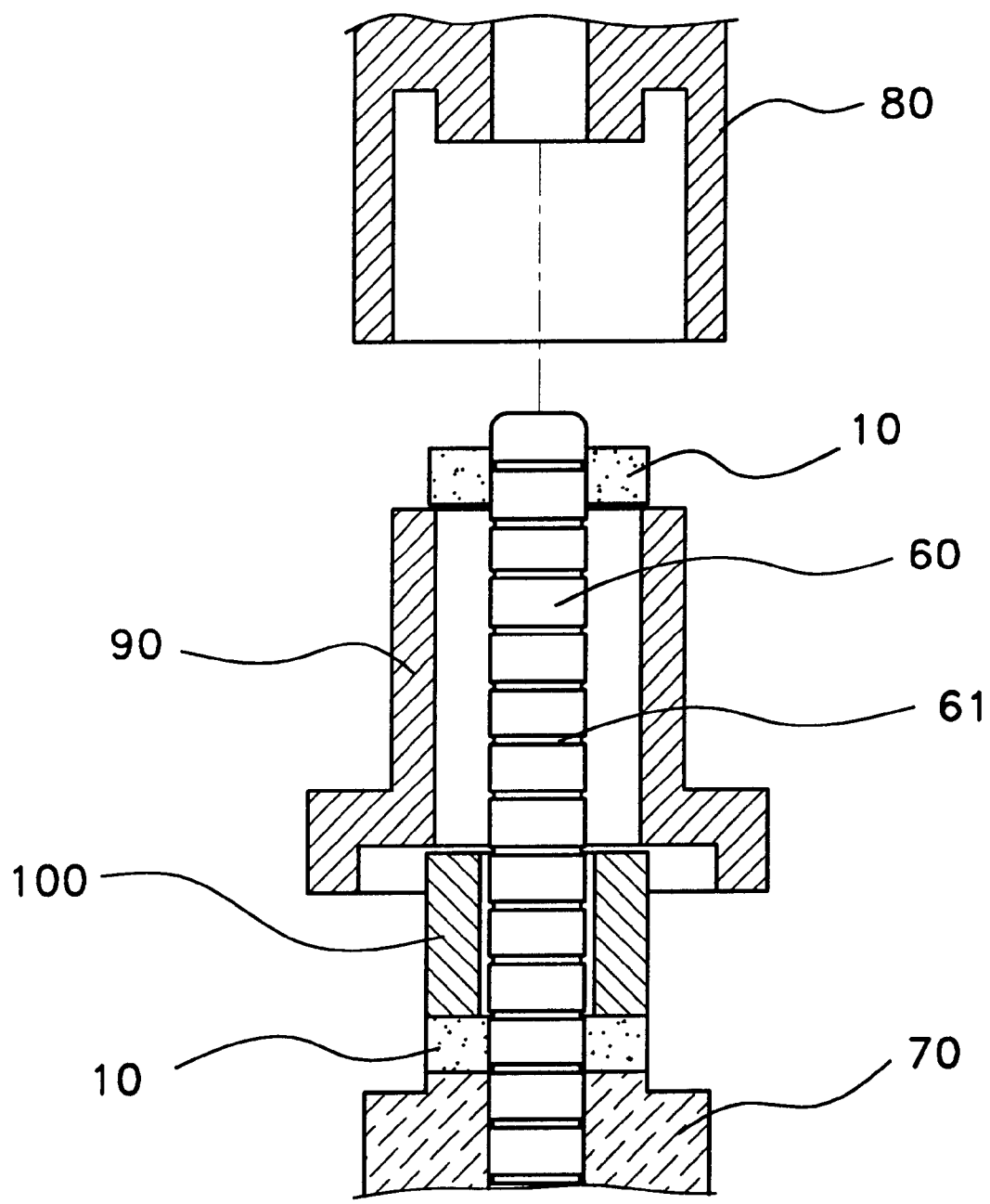
FIG. 12 is a side sectional view showing the bearing unit formation part inserted on a mandrel in the assembling device according to the present invention.

To explain it in more detail, to assemble sintered oilless bearing 10 in bearing holder 90, first, a sintered oilless bearing 10 is inserted to an upper protruded part of mandrel 60, inserted in fixed metal mold 70, as in FIG. 12, and this sintered oilless bearing 10 inserted to mandrel 60 is seated on fixed metal mold 70.

Spacer 100 is inserted to mandrel 60 to be seated, overlapped, on the top part of sintered oilless bearing 10, already seated upon fixed metal mold 70.

If bearing holder 90 is again inserted, even after inserting spacer 100, bearing holder 90 bottom part is put onto spacer 100 top part because the inner diameter of bearing holder 90 has been formed finely smaller than the outer diameter of spacer 100, already inserted.

If another sintered oilless bearing 10 is inserted to mandrel 60 under this condition, the bearing is put onto bearing holder 90 top part, because the outer diameter of sintered oilless bearing 10 at this time has been formed finely larger than inner diameter of bearing holder 90.

Figure 13:
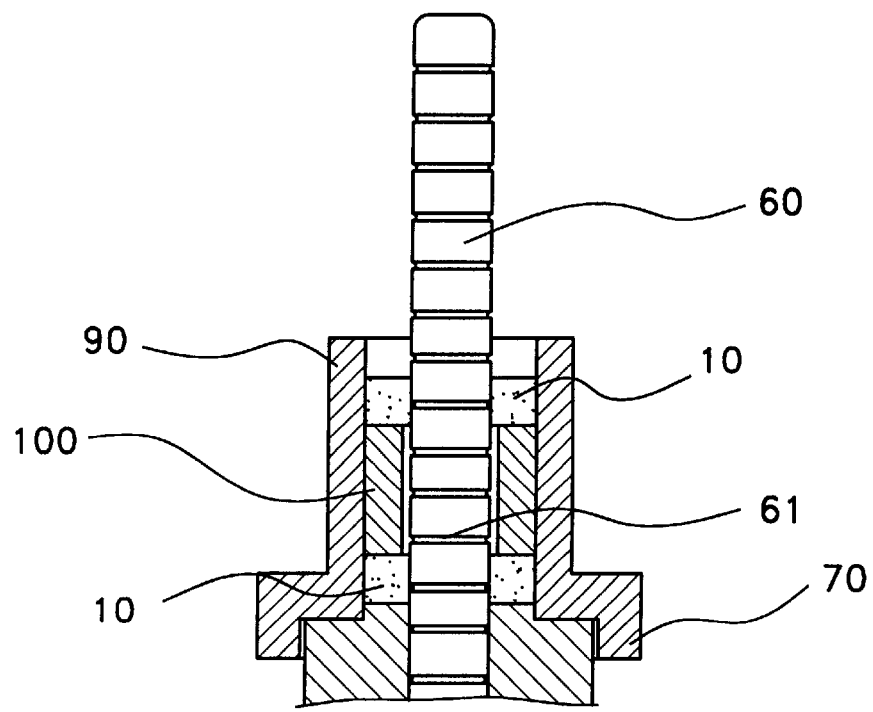
FIG. 13 is a sectional view showing the bearing unit assembled by the assembling device according to present invention.

If lower bearing 10, spacer 100, bearing holder 90 and upper bearing 10 are parallel, accumulated thus and unbound to the outer circumferential surface of mandrel 60 upon fixed metal mold 70 top part and finally upper bearing 10 and bearing holder 90 are pressed from above using a press metal mold 80, a pair of bearings 10 and spacer 100 are coercively inserted in sequence by interference fit into inner diameter of bearing holder 90 as in FIG. 13.

Meanwhile, at the time of pressing by press metal mold 80, sintered oilless bearing 10 is compressed in the vertical direction while the outer diameter surface and the inner diameter surface come into close contact, respectively, with the inner diameter surface of bearing holder 90 and outer diameter surface of mandrel 60 whence inner diameter surface of sintered oilless bearing 10 coming in close contact with mandrel 60 at this time is finely enlarged by compression force of press metal mold 80 and a part of the bearing surface is inserted to correction grooves 61 that are formed in outer diameter surface of mandrel 60 in longitudinal direction.

Figure 14:
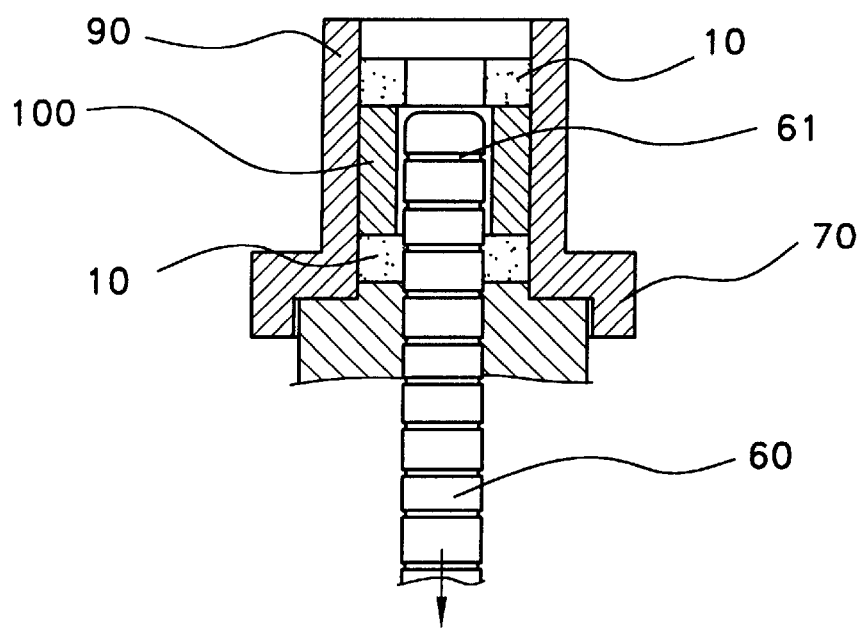
FIG. 14 is a cross-sectional view showing the sintered oilless bearing surface being processed by lowering the mandrel in FIG. 13.

If mandrel 60 is moved down as in FIG. 14, after lifting press metal mold 80 in such state, the inner diameter surface of sintered oilless bearing 10 is again surface processed by correction grooves 61 of mandrel 60 and pores are more filled up.

Thus, the porosity of the inner diameter surface of sintered oilless bearing 10 may be made denser by making pores to be filled up during processing of the inner diameter surface of sintered oilless bearing 10 even during the assembling process as during sizing process.

On other hand the present invention can perform, by means of the method, to process the inner diameter surface of sintered oilless bearing 10 during the assembling process, using mandrel 60, where correction grooves 61 have been formed as described above, while all sizing work is simply done in the sizing process as traditionally.

Namely, correcting rod 20 for the sizing process is made of structure where correction grooves 24 have not been formed while correction grooves 61 are formed only at mandrel 60 of the assembling process, so that inner diameter surface processing is done only at assembling process.

Filling up of pores and surface processing for inner diameter surface can be improved more by correction grooves 24 61 formed on correcting rod 20 or mandrel 60 if sintered oilless bearing 10 is surface processed according to method described above.

Such filling up of pores and surface processing improves surface roughness of the inner diameter surface contacting the motor shaft, particularly the inner diameter surface of the protuberance in the sintered oilless bearing 10, can reduce friction force of contact with shaft, and allows oil film to be always formed in a designated thickness on the inner diameter surface of protuberance, by maximally preventing absorption of oil into inner diameter surface of protuberance which oil is ejected from grooves when the shaft revolves.

If the surface roughness of the inner diameter surface of a sintered oilless bearing 10 is improved and oil the film is stably formed, eventually the force of friction with the shaft is substantially reduced, bearing abrasion is minimized, and motor life cycle period is elongated so that it provides a very useful effect to improve product performance reliability of motor where sintered oilless bearing 10 is applied.

What is claimed is:

1. A method for surface processing a sintered oilless bearing comprising the steps of:

relatively positioning the sintered bearing and a correcting rod having substantially circumferential correction grooves near a first rod end so that the bearing is on the rod and seated on a lower support in a position away from the correction grooves and being peripherally confined by a guide;

applying an upper support above the bearing and compressing the bearing between the supports;

filling up numerous blowholes existing at an inner diameter surface of the bearing by producing relative movement between the bearing and the rod so that the compressed bearing passes the correcting grooves; and separating the bearing from the correcting rod.

2. The method in claim 1, wherein said sintered oilless bearing contains permeated oil and the surface processing occurs during assembly of the bearing into a bearing housing, the correcting rod being a mandrel having a plurality of correction grooves spaced along an outer circumferential surface thereof.

3. A method for surface processing of a sintered, sized oilless bearing containing permeated oil comprising the steps of:

during assembly of the bearing in a bearing holder relatively positioning said bearing and a mandrel having substantially circumferential correction grooves spaced along its surface in a longitudinal direction so that the mandrel extends within the bearing and bearing holder;

pressing the bearing into said bearing holder while both of them are on the mandrel; and surface processing an inner circumferential surface of said bearing as assembled into said bearing holder through relative movement between the mandrel and assembled bearing so that the inner surface of the bearing passes over the correction grooves formed on said outer circumferential surface of said mandrel.

4. An apparatus for surface processing of a sintered oilless bearing comprising:

a correcting rod including:
an upper protuberance correction part having an outer diameter equal to an inner diameter of protuberances formed on the interior of the bearing in which protuberance correction part substantially circumferential correction grooves have been formed on its outer surface to be spaced along the rod,
a lower groove formation part having an outer diameter equal to the inner diameter of the space between bearing protuberances and
a protuberance formation part having an outer diameter smaller than the outer diameter of said protuberance correction part, on the outer circumferential surface including a tapered part which is an interfacial part connecting said protuberance correction part and the groove formation part;
an upper punch which is formed to allow its inner diameter to inserted onto said groove formation part and said protuberance formation part of said correcting rod and which compresses said bearing by pressing from above;
a lower punch which supports said correcting rod by having been inserted onto the lower part of said correcting rod, which lets said bearing inserted onto said correcting rod to be seated on the top part of itself at the same time, and which will move upward so that the inner diameter surface of said bearing is surface processed while passing through said correction grooves of said correcting rod; and
a guide frame supporting the outer circumferential surface so that said upper and lower punches may move up and down vertically.

5. An apparatus for surface processing of sintered oilless bearing comprising:

a mandrel of an upright rod shape having an outer diameter equal to inner an diameter of an protuberance formed at the inner diameter part of the bearing, where correction substantially circumferential grooves have been formed on its outer surface and are spaced in a longitudinal direction;
a fixed metal mold that supports said mandrel from below so that said mandrel can move up and down; and
a press metal mold that presses an upper one of said bearing, a bearing housing, a spacer and a lower one of said bearing inserted onto said mandrel from above said fixed metal mold so that said lower bearing and the upper bearing are compressed to be coercively fitted, interposing said spacer, in the inner diameter of said bearing housing.

6. An apparatus for surface processing of a sintered oilless bearing comprising:

a correcting rod including:
an upper protuberance correction part having an outer diameter equal to an inner diameter of protuberances formed on the inner diameter part of the bearing, in which protuberance correction part substantially circumferential correction grooves have been formed on its outer surface and are spaced in a longitudinal direction,
a lower groove formation part having an outer diameter equal to the inner diameter of the space between said protuberances, and
a protuberance formation part having the outer diameter smaller than the outer diameter of said protuberance correction part, on the outer circumferential surface including tapered part which is an interfacial part connecting said protuberance correction part and groove formation part;
an upper punch which is formed to allow its inner diameter to be inserted onto said groove formation part and said protuberance formation part of said correcting rod and which compresses said bearing by pressing from above;
a lower punch which supports said correcting rod by having been inserted onto the lower part of said correcting rod, which lets said bearing as inserted onto said correcting rod to be seated on the top part of itself at the same time, and which will move upward so that the inner diameter surface of said bearing is the surface processed while passing through said correction grooves of said correcting rod;
a guide frame supporting the outer circumferential surface so that said upper and lower punches may move up and down vertically;
a mandrel of a vertical rod shape having an outer diameter equal to the inner diameter of said protuberances, said mandrel having correction grooves formed on its outer circumferential surface and spaced in a longitudinal direction;
a fixed metal mold that supports said mandrel from below so that said mandrel can move up and down; and
a press metal mold that presses an upper bearing, a bearing housing, a spacer and a lower bearing inserted onto said mandrel from above said fixed metal mold so that said lower bearing and upper bearing are compressed to be coercively fitted, interposing said spacer in said inner diameter of said bearing housing.

* * * * *